Sept. 22, 1959 — E. W. OLSON — 2,905,878
SERVO CONTROL SYSTEM
Filed March 20, 1957 — 2 Sheets-Sheet 1
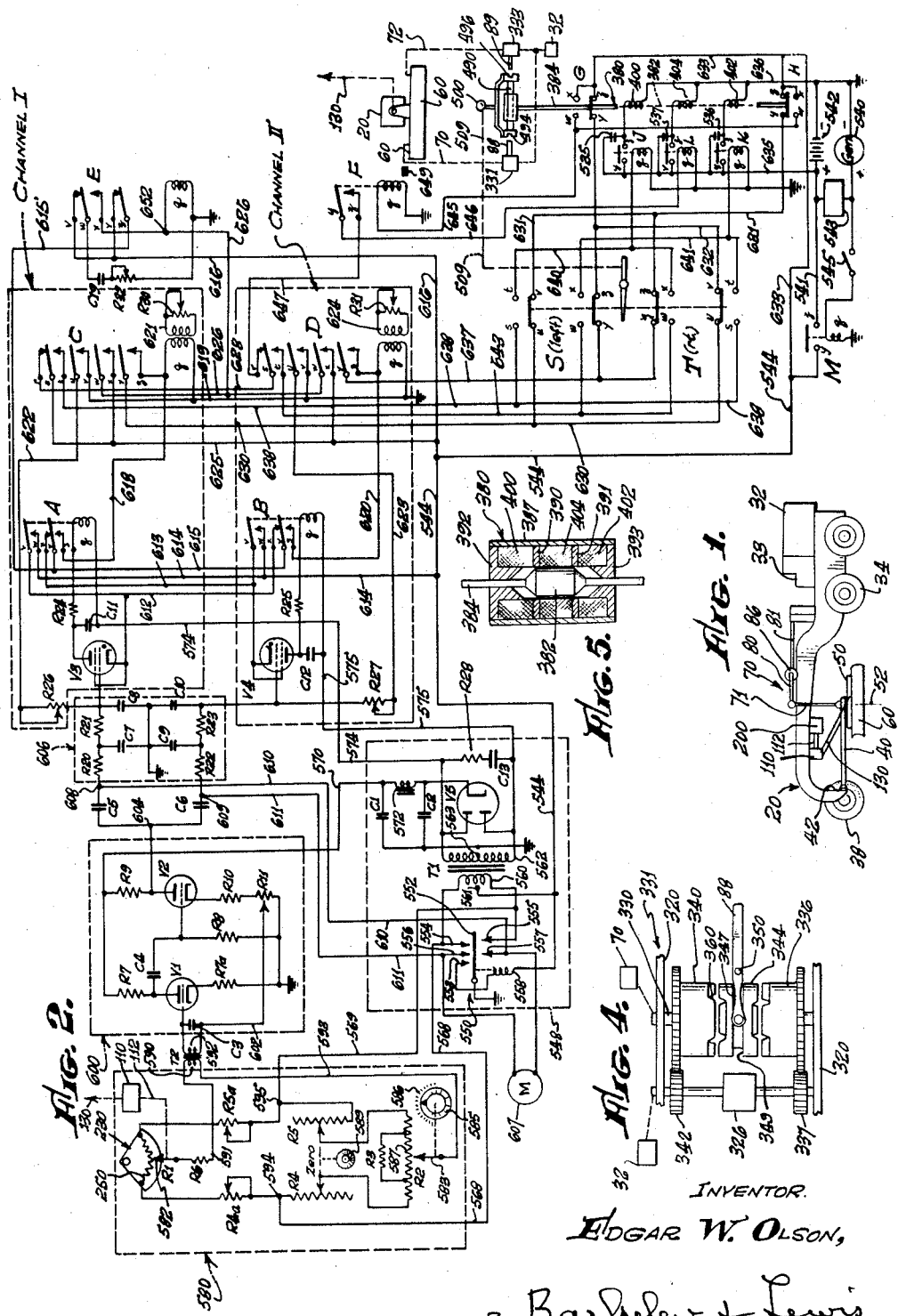
INVENTOR.
EDGAR W. OLSON,
By Barlelew & Lewis Sept. 22, 1959  E. W. OLSON  2,905,878
SERVO CONTROL SYSTEM
Filed March 20, 1957  2 Sheets-Sheet 2

EDGAR W. OLSON,
INVENTOR.
By Barthelew & Lewis

United States Patent Office 2,905,878
Patented Sept. 22, 1959

2,905,878

SERVO CONTROL SYSTEM

Edgar W. Olson, Los Angeles, Calif., assignor to Preco Incorporated, Los Angeles, Calif., a corporation of California Application March 20, 1957, Serial No. 647,330

7 Claims. (Cl. 318—489)

This invention relates to control systems of servo type for positioning or driving a movable member in response to a control signal which represents the member's deviation from a predetermined position or movement pattern.

The invention in certain of its aspects relates more particularly to systems in which the power means for driving the movable member is substantially positive in its operation, in the sense that when the drive operates it drives the member positively at a speed which exceeds some definite value. Such a drive may, for example, be shiftable directly between an idle condition in which the member is stationary and a driving condition in which the member is driven at a definite speed, without any intermediate condition whereby the member is normally drivable at an intermediate speed.

An important class of such positively acting drive means utilizes a continuously driven shaft and a positively acting clutch between the shaft and the driven member.

When a conventional control system operates through a power means having the described type of positive action, it is difficult or impossible to obtain uniformly effective positioning of the controlled member. More particularly, it is difficult with such a system to obtain effective and rapid correction of both large and small deviations without excessive hunting and without sacrificing sensitivity of control.

The present invention solves those problems by means of a control system which causes the member to be driven continuously toward the desired position when its deviation from that position is larger than a critical value; and to be driven intermittently when that deviation is smaller than the critical value. The intermittent action is continued, if necessary, until the deviation is less than the minimum value to which the control system is responsive.

An important aspect of the invention concerns particularly effective and economical means for obtaining the described type of action. That is preferably accomplished by varying the effective sensitivity of the error sensing and control system under control of the drive mechanism. The sensitivity is made relatively high when the drive mechanism is idle, and is made relatively low when the drive mechanism is actuated.

A further aspect of the invention concerns means for adjustably controlling the timing of intermittent drive cycles of the type described. A particular feature of such timing functions, in preferred form of the invention, is that the timing action for the period of drive may be made independent of any irregularity in drive engagement, such as may result, for example, from delay in engagement of a positively-acting clutch.

In many control systems the components of the system are subject to mechanical vibrations and to spurious electrical interactions which are difficult and expensive to eliminate by conventional means. A particular advantage of the present system is that effective and economical means are provided for reducing or eliminating the errors and erratic behavior which would normally result from such spurious effects.

For clarity of illustration but without intending any limitation upon the scope of the invention, the latter will be described primarily with respect to the illustrative example of a servo system for controlling the blade of a grading machine to produce a finished ground surface having a predetermined transverse slope or grade angle. Such a blade control system is further described, and certain preferred features of such a system are claimed, in the copending patent application filed by John T. Bowen, Paul K. Beemer, Reeford P. Shea and the present applicant on January 16, 1957, Serial No. 634,436, under the title "Control System for a Vehicle-Mounted Tool."

A full understanding of the present invention and of its further objects and advantages will be had from the following description of certain illustrative embodiments. However, the particulars of that description, as well as of the accompanying drawings which form a part of it, are intended only as illustration and not as a limitation upon the scope of the invention, which is defined in the appended claims.

In the drawings:

Fig. 1 is a schematic elevation of a typical grading machine embodying a control system utilizing the invention;

Fig. 2 is a schematic drawing representing an illustrative servo system in accordance with the invention;

Fig. 4 is a partially schematic elevation, representing an illustrative clutch structure of positive type;

Fig. 5 is an axial section representing an illustrative electromechanical actuator;

Figure 3:
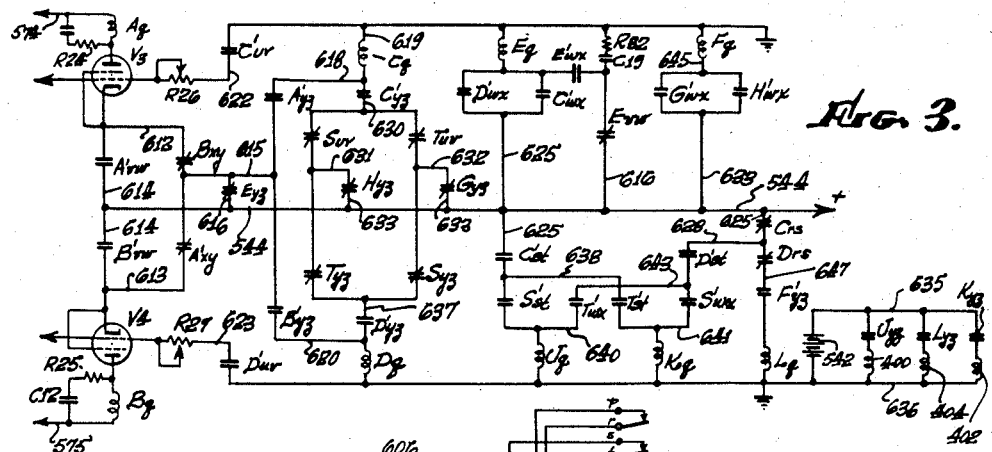
Fig. 3 is a functional schematic diagram corresponding to a portion of Fig. 2.

Referring first particularly to Fig. 1, a typical grading machine is shown in simplified and schematic form. The machine frame 20 is carried by rear driving wheels 34 and front steering wheels 38. The machine power plant is indicated at 32 and the operator's cab at 33. The grader blade 60 is movably mounted with respect to machine frame 20 by means of a drawbar 40 and circle frame 50. The forward end of the drawbar is typically mounted on the machine frame by means of a ball and socket joint 42. The two rearward corners of drawbar 40 are typically supported by left and right drawbar lift mechanisms, which are independently controllable by suitable control levers in the operator's cab 33. As schematically shown, the left drawbar lift mechanism 70 comprises a crank arm 80 operatively connected to the drawbar by the link 71 and driven via suitable gearing 86 and a drive shaft 81. The right drawbar lift mechanism, which is of similar construction, will be denoted generally by the numeral 72.

Circle frame 50 is rotatably adjustable with respect to the drawbar about a generally vertical axis, indicated at 52. Blade 60 is fixedly mounted on the circle frame, and is thus rotatable with it about axis 52 to vary the shear angle at which it engages the ground; and is also rotatable with the drawbar about ball joint 42 to vary the depth of cut and, in particular, to vary the transverse inclination, or grade angle, of the finished ground surface.

A preferred system for automatically controlling that grade angle comprises sensing means responsive to the actual grade angle for which the blade is set and for deriving an electrical signal that represents the angular deviation of that setting from the desired grade angle. That signal is then utilized as error signal by the improved servo system to be described. The existing grade angle for which blade 60 is set may be sensed, as more fully described in the above identified copending application, by the combined action of means, indicated schematically in Fig. 1 at 130, for transferring to machine frame 20 the existing orientation of the cutting edge of blade 60; means shown schematically at 110 for computing the projection of the blade edge on a plane perpendicular to the direction of travel of the machine and for angularly positioning an output element 112 in accordance with the orientation of that projection; and means indicated at 200 for comparing that output angle with a frame of reference, which typically depends upon the direction of gravity and the direction of travel of the vehicle. Means 200 typically comprises a suitable damped pendulum having its axis parallel to the direction of travel of the grading machine; and an electrical transducer of any suitable type for comparing the angular position of the pendulum about that axis with the angular position of output shaft 112 of computer 110. For example, such a transducer may comprise an arcuate potentiometer winding mounted on the pendulum and a potentiometer brush rotatable about the pendulum axis and driven from shaft 112.

That illustrative type of transducer is represented schematically at the upper left of Fig. 2, and comprises the potentiometer R1, which has its winding mounted on pendulum 230. Movement of the potentiometer brush 582 is controlled from blade 60 via the linkage 130, computer 110 and computer output connection 112. Potentiometer R1 may thus be considered to represent illustrative means for producing an electrical signal that represents a position variable of any movable member to be controlled.

Many aspects of the present invention may be utilized in connection with substantially any type of servo control system. Certain other aspects are particularly well adapted for use in connection with systems having a drive control that operates positively in an on-or-off manner, or that may be so operated. Such drives may, for example, be either hydraulic or mechanical. However, for the sake of definiteness and clarity, the invention will be described primarily with reference to an illustrative type of mechanical drive in which power is derived from a continuously driven power shaft, and is controlled by means of a positively acting clutch movable in one direction for forward drive and in the other direction for reverse drive. Such a control mechanism is shown somewhat schematically in Fig. 4, and is denoted generally by the numeral 331.

An output shaft 330 is journaled on the frame portions 320, which may be walls of a clutch housing. An output clutch member 344 is mounted on shaft 330 in rotationally fixed relation, as by spline structure not shown, and is axially movable under control of a fork 347, the fingers of which engage a peripheral groove 349 in the clutch member. Two oppositely driven clutch members 336 and 340 are rotatably mounted on shaft 330 in axially fixed positions on opposite sides of clutch member 344. Clutch members 336 and 340 may, for example, be driven from that main power plant 32 of the machine, as via the gear trains 337 and 342. A reversing gear is shown schematically at 326. Suitable speed reduction means are preferably included in the drive. A manually operable control handle may be provided, as indicated schematically at 88 to permit convenient manual control.

The two axial faces of movable clutch member 344 and the opposing faces of clutch members 336 and 340 are provided with interengageable formations, shown as the clutch teeth 360. The opposing sets of clutch teeth are of such form that when they are engaged the drive is effectively positive and when they are disengaged the driving connection is completely released. The teeth are preferably of trapezoidal form to facilitate automatic release of the clutch if an excessive load is encountered. However, under normal operating conditions the clutch action is effectively positive in nature.

Output shaft 330 is coupled in any suitable manner, typically incorporating further speed reduction, to left blade lift mechanism 70. Mechanism 70 thus acts to raise or lower the left end of blade 60, depending upon the direction of drive. With clutch fork 347 pivoted intermediate its length and carrying handle 88 at its free end, as illustratively shown, upward movement of the handle causes movable clutch member 344 to engage member 336. For definiteness of description, that engagement will be taken to drive the left end of blade 60 upward. Downward movement of handle 88 correspondingly causes engagement of clutch member 340 and drives the left blade end downward.

A second clutch mechanism 333, typically of identical construction, is connected between engine 32 and right hand blade lift mechanism 72, and is provided with a manual control handle 89. Upward movement of handle 89 causes the right hand end of blade 60 to be driven upward; downward handle movement drives that blade end downward. Clutch mechanisms 331 and 333 are shown schematically at the right of Fig. 2, drivingly connected to grader blade 60 via the respective drive mechanisms 70 and 72, which are represented as dashed lines.

Electro-mechanical actuating mechanism of any suitable type is provided for generating mechanical control movements in response to the tool sensing mechanism already mentioned. An illustrative electro-mechanical actuator 380 is shown schematically in Fig. 5. A solenoid armature 382 is carried by the actuator rod 384. Rod 384 is slidably mounted on the longitudinal axis of the cylindrical solenoid core. That core is shown substantially vertical in the present instance. It comprises an outer cylindrical sleeve 387 with annular end pole pieces 392 and 393 rigidly mounted at its upper and lower ends, respectively, and with two annular pole elements 390 and 391 rigidly mounted intermediate its length and forming three coil chambers. Solenoid armature 382 is of generally cylindrical form with convex conical upper and lower end portions. Pole pieces 392 and 393 are of complementary concave conical form, arranged to fit the respective ends of the armature when it is at the upper and lower limits of its travel. All of the core elements are of material having high magnetic permeability, such as soft iron.

Upper and lower driving coils 400 and 402 are coaxially mounted within core sleeve 387 above pole 390 and below intermediate pole 391, respectively; and a centering coil 404 is similarly mounted between those poles. When the armature is in neutral position at the midpoint of its travel, as illustrated, the inner edges of the two intermediate poles are closely adjacent the respective ends of the cylindrical portion of the armature, forming with the armature body and with the central portion of core sleeve 387 a substantially closed magnetic loop. Energization of centering coil 404 by an electric current therefore tends to maintain the armature in neutral position, or to return it to that position if it has been deflected.

When the armature is at either end of its travel, the end pole piece 392 or 393 is closely adjacent the corresponding conical end portion of the armature, forming with the armature and the adjacent intermediate pole piece a substantially closed magnetic circuit. Hence energization of a driving coil tends to drive the armature toward the corresponding end of its travel. It is preferred to supply direct current power to all three of the coils and to wire them in such a way that the north magnetic poles of both driving coils, when energized, point in the same direction, while that of the centering coil is oppositely directed. That has the advantage that energization of the centering coil is more effective to release the armature from the end pole piece.

Actuator 380 may be coupled selectively in any suitable manner to either one of the clutch mechanisms 331 and 333. As schematically shown in Fig. 2, the upper end of actuator rod 384 carries a selector member 490 which is transversely movable under control of a selector handle 500. Member 490 carries a fitting 494 adapted to engage clutch handle 88 when selector handle 500 is moved to the left, and carries a fitting 496 adapted to engage clutch handle 89 when selector handle 500 is moved to the right.

In the present embodiment, the controlled variable is an angle, specifically the grade angle of the grader blade; whereas the drive mechanism utilized for controlling that angle is essentially translational in its action. That translational movement produces blade rotation, but the sense of the blade rotation produced by upward drive (for example) of the left end of the blade is opposite to that produced by upward drive of the right end of the blade. Hence, if the blade is displaced clockwise, for example, from the desired angle, that resulting signal from the blade sensing mechanism must be arranged to cause either upward or downward drive of the blade, depending upon which blade drive mechanism is being utilized. That is accomplished by means of electrical switching mechanism operated by selection control lever 500. That switching mechanism not only performs the function of reversing the direction of drive (for a given error signal) when the control handle is shifted between its two drive positions; but also performs the function of electrically isolating the solenoid winding controls when handle 500 is in neutral position, as illustrated.

The present switching mechanism comprises two switch assemblies S and T which are actuated via a linkage 509 by movement of handle 500 to the left and to the right, respectively, as seen in Fig. 2. The switches are connected in the electrical control system in such a way that, for any particular error signal from the sensing system, operation of switch S and of switch T cause solenoid actuator 380 to be driven in opposite directions. When neither switch S nor switch T is operated solenoid action is disabled.

Illustrative electrical circuit means in accordance with the present invention for energizing solenoid windings 400, 402 and 404 in response to the signal from potentiometer 250 are illustrated schematically in Fig. 2.

The two solenoid driving windings 400 and 402 and centering winding 404, already described, are shown schematically at the lower right of Fig. 2. Those windings have one terminal grounded and the other connected to a voltage source via the switches of the respective power relays J, K and L, which may, for example, comprise conventional heavy duty contactors of automotive type. The relay switches are shunted by the respective arc suppressing capacitors 535, 536 and 537.

A source of direct current power is indicated schematically as the generator 540 and storage battery 542, which have their negative terminals grounded and their positive terminals connected together in the usual manner via the voltage-regulating cut-out switch 543. Those elements may typically be part of the regular equipment of the grading machine. The positive terminal of battery 542 is connected to the main power line 544 of the present electrical control system via the line 541 and the normally open switch yz of a cut-out relay M. The winding q of relay M is connected via the manual master switch 545 between ground and the positive terminal of generator 540. Hence the system can be energized by closure of master switch 545 whenever the generator is operating, but is cut off by release of relay M if the generator is idle. Generator 540 and battery 542 typically maintain line 544 at a relatively low voltage, such as 6 or 24 volts, for example, with respect to ground; and that voltage source will be taken as positive for definiteness. The electrical term "ground" in the specification and claims may refer to any convenient reference level of potential, which is represented illustratively in the conventional manner.

A power supply system, indicated generally by the numeral 548, comprises the vibrator 550, the step-up transformer T1 and the full-wave rectifying tube V5. That system develops from the power on line 544 a higher voltage for operation of the electronic tubes of the system and a square wave voltage for operating the bridge network to be described. Vibrator 550 has a grounded conductive reed 552 which engages a driving contact 553, a primary set of working contacts 554 and 555, and a secondary set of working contacts 556 and 557, arranged typically as shown in Fig. 2. The driving winding 558 of the vibrator is connected between line 544 and driving contact 553. The vibrator frequency may have any suitable value, such as approximately 100 cycles per second, for example.

The primary winding 560 of transformer T1 is connected directly between primary vibrator contacts 554 and 555 and has a center tap 561 which is connected to line 544. Upon operation of vibrator 550, an alternating current voltage of substantially square wave form is applied to T1. The same square wave voltage is supplied via the lines 568 and 569 to the bridge network to be described. For purposes of description, the square wave voltage from line 568 to ground will be taken as the direct phase, that from line 569 to ground as the inverted phase. The secondary winding 562 of transformer T1 is connected between the two plates of rectifying tube V5 and has a grounded center tap 563. The cathode of V5 is connected to the line 570 via a filter network comprising the series connected choke coil 572 and grounded capacitors C1 and C2. The end terminals of transformer secondary 562 are also connected to the lines 574 and 575, which supply the high voltage square wave in direct and inverted phase, respectively, as plate voltage to the gas tubes V3 and V4 to be described. The transformer secondary is shunted by a buffer circuit comprising series connected resistance R28 and capacitor C13, to smooth the sharp voltage peaks that would otherwise result from the abrupt make and break action of the vibrator.

An illustrative sensing circuit of bridge type is indicated generally by the numeral 580. The four arms of the bridge comprise primarily the two resistances into which potentiometer R1 is divided by its movable contact 582 and the two resistances into which potentiometer R2 is divided by its movable contact 583. Alternating current power is supplied to the bridge from lines 568 and 569, already described, at the terminals 594 and 595, respectively. The bridge output is taken between the movable contacts 582 and 583 of the potentiometers R1 and R2. The position of potentiometer R1 may be considered in general to represent the actual condition of some physical variable that is to be controlled, whereas the position of potentiometer R2 represents the desired condition of the variable. In the present illustrative overall system, potentiometer R1 is driven by a dual input system. The position of the potentiometer winding is typically controlled by swinging of pendulum 230, and the potentiometer brush is driven from grader blade 60 (indicated at the extreme right of Fig. 2) via the linkage system 130.

Potentiometer R2 is typically set manually, as by the control knob 585, and its position may be considered to represent the desired value of the physical variable to be controlled. A scale, indicated at 586 may be provided, calibrated directly in terms of that variable. In the present instance, scale 586 directly indicates the grade angle each side of zero, for example in percent of slope, in slope ratio, or in degrees. Grade selecting potentiometer R2 is preferably mounted in a position conveniently available to the operator.

Variable balancing resistances are preferably provided in the respective arms of the bridge. As shown, variable resistances R4 and R5 are connected in series with the respective sides of R2 and are ganged in opposition for control by a single knob 589. Variable resistances R4a and R5a are connected in series with the respective sides of R1 and are typically individually adjustable. Adjustment of R4 and R5 may be employed as a zero setting, to produce bridge balance when R1 and R2 are at nominally corresponding positions; and adjustment of R4a and R5a may be used as a scale setting, to insure that movement of R2 through a given scale interval will be balanced by a corresponding movement of R1.

The bridge output from the movable contacts of potentiometers R1 and R2 is supplied via the lines 591 and 593 to the primary winding 590 of the amplifier input transformer T2.

The voltage from the secondary 592 of transformer T2 is supplied as input signal to an amplifier indicated generally by the numeral 600. Amplifier 600 may be of any suitable type, and is shown typically comprising two vacuum tubes V1 and V2 coupled via the capacitor C4. One side of the transformer secondary is connected to the grid of tube V1. An inverse feedback circuit is preferably provided, represented illustratively by the line 602, which connects the other side of transformer secondary 592 to the movable contact of the potentiometer R11, which forms part of the cathode resistance of amplifier tube V2. The effective gain of amplifier 600 is adjustable by variation of potentiometer R11, and is preferably such as to produce at the amplifier output 604 a signal of approximately 10 to 20 volts for the smallest input signal to which the control system is desired to respond. That output signal constitutes an amplified error signal from bridge 580. It is typically a square wave of which the amplitude corresponds to the degree of bridge unbalance and the phase represents the direction of that unbalance. The phase of the waveform at 604 is preferably closely in phase, or 180° out of phase, with the movement of vibrator arm 552. Illustrative phase adjusting means for compensating any net phase distortion from bridge 580, transformer T2 and amplifier 600 is shown as the condenser C3 connected in shunt to the secondary of transformer T2.

The alternating current error signal at 604 is demodulated and filtered to produce two direct current control signals, which are positive and negative, respectively, when the signal at 604 has one phase, and which are negative and positive, respectively, when the signal at 604 has the opposite phase. Those two control signals are supplied to respective control channels, designated channels I and II, which are responsive only to a positive signal and which act to drive the controlled variable, in the present instance the grader blade, in respective opposite directions. Demodulation of the error signal is accomplished in the present system by supplying the amplifier output from 604 in parallel to two capacitors C5 and C6 and alternately grounding the output terminals 608 and 609 of those respective capacitors in synchronism with the alternating current supplied to bridge 580. Terminals 608 and 609 are connected via the lines 610 and 611 to secondary contacts 557 and 556, respectively, of vibrator 550. The grounded armature 552 of the vibrator alternately engages those demodulating contacts in accurate synchronism with its engagement of modulating contacts 554 and 555 through which alternating current is supplied to the bridge, as already described. As a result, the potential at terminal 608 and contact 557 alternates between zero and a positive voltage when the signal at 604 is in phase with the voltage supplied to input terminal 594 of the bridge; and alternates between zero and a negative voltage when the signal at 604 is in opposite phase to that bridge input.

The same is true of the potential at terminal 609 and contact 556 with respect to the voltage supplied to the opposite bridge terminal 595. Thus two complementary square wave forms are produced at 608 and 609, which are alternately zero and which depart from zero in opposite directions. The periodic potential at 608 is either positive or negative with respect to that at 609 according as the error signal at 604 is in phase with one or other of the bridge supply voltages at 594 and 595. The difference between those potentials therefore represents in magnitude and polarity the degree and direction of unbalance of the bridge, and hence represents the magnitude and direction of the existing departure of the blade from the desired grade angle set by potentiometer R2. That information may conveniently be presented to the operator by connecting the suitably calibrated direct current voltmeter 607 between lines 610 and 611. The meter deflection indicates the direction of the error in the grade angle, and its approximate magnitude if it is small. However, amplifier 600 is preferably designed to saturate at large input error signals. If strictly proportional indication of the error is desired, meter 607 may be driven via a special amplifier and demodulator of suitable type.

In utilizing the described periodic and substantially square wave voltages at terminals 608 and 609 for controlling the drive mechanism for the grader blade, to drive the blade in a direction to reduce the error signal, it is preferred to supply the signal voltage of each channel to a discriminating device which determines whether or not the channel is to be actuated, and whether it should remain actuated. The continuously variable error signal is thus transformed into a two-valued signal, the two values corresponding to on and off. In the present embodiment the discriminating means of the respective channels comprises illustratively the gas tubes V3 and V4, to be described more fully. The voltages at 608 and 609 might, for example, be supplied directly to the control grids of the respective gas tubes V3 and V4, to be described. However, when the system is to be used under rigorous physical conditions, such as those of the present environment, the two periodic voltages are preferably first smoothed by supplying them to suitable respective filter networks. Such networks are typically represented by the series resistances R20, R21 and the grounded capacitors C7, C8 in one channel and by the series resistances R22, R23 and the grounded capacitors C9, C10 in the other channel. The filtered signals are supplied to the respective grids of gas tube V3 in control channel I and of gas tube V4 in control channel II.

Provision of the described filter networks between terminals 608, 609 and the respective gas tubes V3, V4 permits the great advantage of rendering the entire control system effectively independent of spurious signal voltages that are transient or that are periodic with a period other than that of vibrator 550. For example, in the present embodiment, the described mechanism for sensing the actual grade angle of blade 60 is typically somewhat responsive also to vibrational movement of the entire machine frame, such as may result from operation of the main power plant 32. Engine 32 typically operates at a speed approximating 30 cycles per second, and the resulting vibration can cause a periodic variation of corresponding period in the position of potentiometer 230. The relatively high frequency alternating current error signal at 604 is thereby modulated sinusoidally at the lower frequency of the engine vibration. The phase-sensitive demodulation of that combined signal by alternate grounding of terminals 608 and 609 does not remove the vibrational component, which appears as a corresponding modulation of the periodic signal voltages at 608 and 609. In passing through the respective filter networks, those voltages are averaged with respect to time, and if the filters are designed with a suitable time constant the vibrational component of the signal may be effectively removed. It has been found that a filter time constant approximately three times the period of a spurious periodic signal component provides effective elimination of that signal component without unduly extending the response time of the overall system. Thus, in the present instance, a filter time constant of approximately 0.1 second renders the system substantially non-responsive to engine vibration at normal engine speeds.

Control channel I comprises primarily gas tube V3, an initial relay A and a secondary relay C; while control channel II comprises primarily gas tube V4, an initial relay B and a secondary relay D. Interlock circuits, to be described, prevent simultaneous operation of both channels. Operation of the secondary relay of channel I or II energizes solenoid deflection coil 400 or 402, respectively; and also causes operation of both relays E and F, which perform timing and control functions to be described.

All of those relays are typically arranged to operate promptly upon energization of their respective windings; but secondary relays C and D and timing relays E and F are provided with means of any suitable type to delay their release by definite time periods following deenergization. As indicated, relays C and D have delay windings 621 and 624 which are closely coupled with the actuating windings $q$ and are shunted by respective resistances R30 and R31. Those resistances are preferably variable, as indicated, for adjusting the delay time. The delay windings may be wound on the same cores and axially adjacent the actuating windings of the relays. Relay F may be provided with a single closed loop or slug of relatively heavy copper, indicated schematically at 649, which provides a predetermined fixed release delay of about 0.2 second, for example. The delay circuit for relay E preferably permits adjustable delay times up to about 0.5 second, for example, and typically comprises capacitor C19 and variable resistor R32 connected in a manner to be described.

The plate of gas tube V3 is connected via series resistor R24 and the winding $q$ of relay A to line 574, already described; and the plate of gas tube V4 is connected via R25 and the winding $q$ of relay B to line 575. Each plate thus receives effective plate voltage, typically about 200 volts above ground potential, only during alternate half-cycles of vibrator 550. If a tube fires during the half-cycle of plate energization, it is necessarily extinguished during the following half-cycle, and fires again only if the grid remains sufficiently positive. If the periodic plate energization of each gas tube is synchronized with the periodic signal voltage at the corresponding point 608 or 609, the filter networks 606 may be omitted if desired. When those networks are included, as is preferred for the present type of system for the reasons already stated, the grids receive substantially direct current signals and the phase relation of the periodic plate energization is immaterial. The capacitors C11 and C12 are preferably connected in shunt to the respective plate loads, and serve to maintain current flow through the relay windings during the half-cycle periods following gas tube conduction, when there is substantially zero current in the respective lines 574 and 575. Hence, in spite of its periodic nature, conduction through gas tube V3 or V4 normally causes positive operation of its primary relay A or C.

The gas tube of each channel is provided with two parallel cathode circuits to line 544. When either of those circuits is closed, and in absence of a signal at 604, the tube is normally biased beyond cut-off; for the tube grid is then effectively grounded via vibrator 550, and line 544 is positive with respect to ground by more than the tube cut-off potential. On the other hand, when bridge 580 is not balanced, producing at 604 a signal which exceeds some critical amplitude, one or other of the tube grids is raised above cut-off potential, permitting its tube to fire on the following half-cycle of plate energization. For example, if the normal grid bias due to battery 542 is −6 volts and the gas tube fires at the typical value of −2 volts cathode to ground the signal must raise one of the tube grids approximately 4 volts above ground potential to fire the tube. The tube cathodes are heated in any convenient manner, circuitry for that purpose being omitted from Fig. 2 for clarity of illustration.

Figure 8:
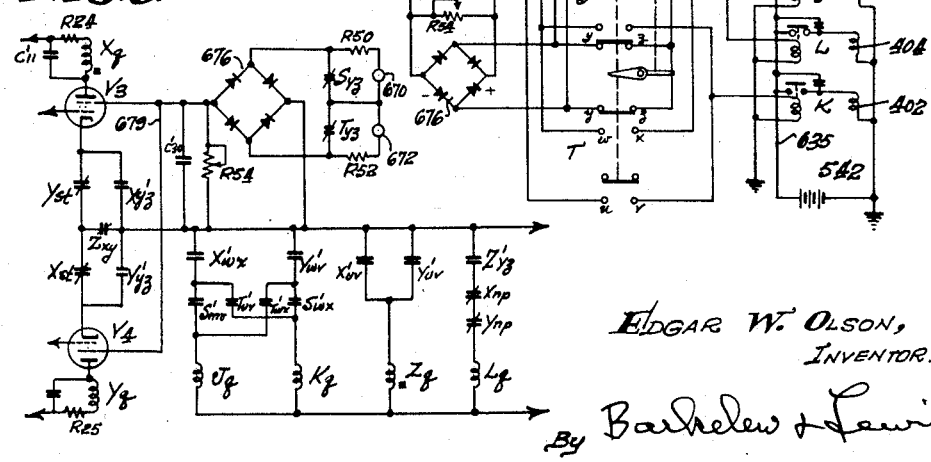
Fig. 8 is a functional schematic diagram corresponding to Fig. 7.

For convenience of description, a particular switch of a relay or switch assembly will often be designated by the capital letter representing the relay or switch assembly, followed by the lower case letters representing the two contacts of the particular switch. A prime applied to the capital letter will indicate that the designated switch is normally open, and hence is closed only if the relay or switch assembly is operated. Absence of a prime indicates that the switch in question is normally closed, and opens on operation of the relay or switch assembly. The winding of a relay is designated by the letter $q$. The line 544, which is typically about 6 volts positive with respect to ground potential, will often be designated simply as +. That notation is employed also in Figs. 3 and 8, in which normally open switches are indicated as two transverse lines, with an oblique line added for normally closed switches. The elements in Figs. 3 and 8 are rearranged for clarity of illustration, the correspondence between the windings and switches of the several relays being indicated only by the described notation.

In the described notation, one of the cathode circuits for tube V3 is via the line 612, switch B$xy$, the line 615, switch E$zy$, and line 616 to +. The corresponding cathode circuit for tube V4 is via the line 613, switch A$xy$ and then again via line 615, switch E$zy$ and line 616 to +. Hence each of those cathode circuits is effective only if the secondary relay of the other channel is idle, and only if timing relay E is idle. That is the case when the entire system is idle, and the described cathode circuits are therefore normally available for initial tube operation, and will be designated actuating circuits. The actuating circuit for each tube is disabled upon operation of the primary relay of the other tube, and also upon operation of timing relay E.

The second cathode circuits referred to are holding circuits which are normally open, but close upon operation of the respective primary relays A and B. The holding cathode circuit for tube V3 is via line 612, switch A$'vw$ and line 614 to +; that for tube V4 is via line 613, switch B$'vw$ and line 614 to +.

Operation of primary relay A or B closes the cathode holding circuit for that channel via switch A$'vw$ or switch B$'vw$, and opens the cathode actuating circuit for the other channel at switch A$xy$ or B$xy$, as already described. Also, operation of primary relay A or B completes an operating circuit for the secondary relay C or D of the active channel. That operating circuit for relay C of channel I extends from ground via line 619, the relay coil C$q$, the line 618, switch A$'zy$, the line 615, switch B$yx$, line 612, switch A$'vw$, and line 614 to +. The corresponding operating circuit for secondary relay D is from ground via the relay coil D$q$, the line 620, switch B$'zy$, line 615, switch A$yx$, line 613, switch B$'vw$ and line 614 to +. A parallel circuit from line 615 to + via switch E$zy$ and line 616 is provided so long as relay E is idle. That connection forms part of the described actuating cathode circuits of gas tubes V3 and V4, and is not essential to operation of secondary relays C and D.

Operation of secondary relay C or D performs four distinct functions, two of which in the present embodiment are independent of the condition of selector switches S and T, and two of which are conditioned upon operation of one or other of those switches.

Firstly, secondary relay operation energizes either solenoid winding 400 or solenoid winding 402, depending upon whether selector switch S or T has been operated. Switch contact $s$ of relay C is connected directly to + via line 625. Hence, operation of relay C connects the line 638 to + via switch C'*ts*, and thereby either operates relay J via switch S'*st* and the line 640 (if S is operated); or operates relay K via switch T'*st* and the line 641 (if T is operated). Contact *s* of relay D might be connected directly to + via line 625 (like the corresponding contact of relay C). However, the connection shown from D*s* to + via line 628, switch C*rs* and line 625 is functionally equivalent since switch C*rs* is closed whenever relay D is operated, and reduces the number of switch armatures required on relay D. With D*s* thus connected to +, operation of relay D (C being idle) connects the line 643 to + via D'*ts* and C*rs*, and thereby either operates relay K via switch S'*wx* and line 641 (if S is operated); or operates relay J via switch T'*wx* and line 640 (if T is operated). Operation of relay J or K immediately energizes the corresponding solenoid driving winding 400 or 402 by means of power from any suitable source, shown as the battery 542, supplied via the lines 635 and 636. Armature 382 and actuating rod 384 are thereby driven upward or downward, causing engagement of the clutch mechanism and driving the grader blade drive mechanism in the manner already described. The limit switches G and H are preferably arranged to be operated substantially simultaneously with, or shortly after, actual engagement of that drive mechanism. The limit switches may be operatively connected to any convenient portion of the control linkage that moves with the clutch itself. As shown schematically, the switches are operated by actuator rod 384.

Secondly, secondary relay operation closes a holding circuit for the relay itself via the normally closed armature limit switch G*yz* or H*yz*, which will presently be opened as a result of solenoid actuation and armature movement. That holding circuit prevents release of the secondary relay, regardless of the condition of the primary relay A or B, until the solenoid armature has moved far enough to open the limit switch. As soon as that limit switch has been operated, the holding circuit is opened and control of the secondary relay is returned to the primary relay of the channel.

Each holding circuit includes two parallel-connected normally closed switches associated with switch assemblies S and T, respectively. An equivalent function could be obtained in a more conventional manner with normally open switches. However, the illustrated method of connection is convenient and reduces the required total number of switch armatures for selector switches S and T. Specifically, in the present embodiment the holding circuit for secondary relay C of channel I leads from grounded line 619 through relay winding C*q* and then via switch C'*zy* to the line 630. Two parallel circuits lead from line 630 to +. One leads via selector switch S*uv*, the line 631, limit switch H*yz* and the line 633 to +; the other via selector switch T*uv*, the line 632, limit switch G*yz* and line 633 to +. When switch T is operated, the first of those circuits is effective; when switch S is operated, the second circuit is effective. In each instance, relay C is held (independently of its initial actuating circuit via switch A'*yz*) until the limit switch G or H is operated by armature rod 384. The corresponding holding circuit for relay D of channel II leads from grounded line 619 through relay winding D*q* and switch D'*zy* to the line 637; then either via selector switch T*yz*, line 631, and limit switch H*yz* to line 633 and + (when selector switch S is operated); or via selector switch S*yz*, line 632 and limit switch G*yz* to line 633 and + (when selector switch T is operated).

Thirdly, secondary relay operation in either channel reduces the effective sensitivity of response of that channel to the signal at 604. As illustrated, the circuit for producing that desensitizing action connects the grid of gas tube V3 or V4 via a resistance to a relatively negative potential, taken as ground. The series resistance is preferably variable to control the degree of desensitization produced. That desensitization of the system is performed in the present embodiment directly by the actuated secondary relay, but may be performed alternatively via any of the control mechanism between that relay and the driven member. In channel I the desensitizing circuit leads from the grid of V3 via the variable resistance R26, the line 622, switch C'*uv*, and line 619 to ground. The corresponding circuit in channel II leads from the grid of V4 via variable resistance R27, the line 623, switch D'*uv*, and line 619 to ground.

Closure of the desensitizing circuit in either channel raises the critical signal amplitude required to maintain periodic firing of the gas tube on subsequent half-cycles of plate energization. So long as the degree of unbalance of bridge 580 is sufficient to maintain the signal at 604 greater than that increased critical value, the gas tube continues to fire every half-cycle, and the desensitizing circuit does not affect operation of the system. However, if the signal at 604 falls below that increased critical value, the gas tube in the active channel ceases to fire. The primary relay A or B of the active channel is thereby idled. However, the secondary relay C or D remains operated via the holding circuit already described until that circuit is opened at limit switch G*yz* or H*yz*, insuring at least momentary engagement of the bladed driving mechanism each time one of the channels is activated. As will be pointed out more fully, the desensitizing means may act upon the control system at any convenient point ahead of the discriminating means, represented in the present embodiment by gas tubes V3 and V4. It may, for example, involve a feedback loop having variable properties, but is clearly distinct from an ordinary servo loop because of that variation.

Fourthly, secondary relay operation closes an operating circuit for timing relay E. In channel I that operating circuit extends from + via the line 625, switch C'*xw*, the line 626 and relay winding E*q* to ground. In channel II the circuit is the same except that switch D'*xw* replaces switch C'*xw* those two switches being connected in parallel.

Operation of relay E opens the connection between line 615 and + at switch E*yz*, disabling the described actuating cathode circuits for gas tubes V3 and V4. That does not prevent tube operation so long as the described holding cathode circuit remains closed by operation of relay A or B; but once those relays are both idled, neither tube can fire again until relay E returns to idle condition.

Operation of timing relay E also opens switch E*vw*, disconnecting one terminal of the capacitor C19 from its charging circuit via line 616 to +; and connects that capacitor instead to + via switch E'*wx* and line 626, which forms part of the described operating circuit for relay E. The other terminal of C19 is connected to ground via the resistance R32, which is preferably adjustable, as indicated. The described transfer of capacitor C19 from line 616 to line 626 maintains the charge on the capacitor so long as line 626 remains connected to + via the operated secondary relay C or D. When that relay is idled, however, capacitor C19 discharges via R32 and the relay coil E*q*, maintaining relay E operated for a definite time period which is variable by adjustment of R32. That time is made sufficient to permit all transient voltages that may result from operation of the system to substantially disappear before relay E is idled. Such voltages are thereby prevented from producing spurious firing of either gas tube V3 or V4.

Timing relay F is operated directly by closure of the normally open switch G'*wx* or H'*wx* of whichever limit switch is operated by movement of solenoid armature rod 384. Those two switches are connected in parallel between line 633, which leads to +, and the line 645, which leads to one side of relay coil F*q*, the other side being grounded. Closure of F'*yz* upon operation of relay F prepares a circuit for energizing centering solenoid winding 404 via power relay L. That circuit leads from ground through relay winding L*q* and via the line 646, switch F'yz, the line 647, switch Drs, line 628, switch Crs and line 625 to +. That circuit remains open unless both secondary relays C and D are idle. Hence, in practice, centering solenoid winding 404 is energized only after the solenoid driving winding 400 or 402 has been deenergized via power relay J or K upon idling of secondary relay C or D.

Centering solenoid winding 404 then remains energized until relay F releases. That occurs at a definite time following the release by armature rod 384 of the operated limit switch G or H. That time period may be determined in any suitable manner. For example, release of relay F may be delayed for a desired period by providing a copper slug, indicated schematically at 649, adjacent the magnetic armature of relay F. The delay in release of relay F is adjusted to maintain current in centering winding 404 until actuator 380 has returned to its normal intermediate position and has come to rest. The time required may vary considerably with the detailed design of the solenoid structure. An illustrative time period from release of the limit switch to deenergization of coil 404 is about 200 milliseconds. It has been found that the described arrangement prevents oscillations of the armature from causing opposite clutch engagement, and permits the armature to be fully returned to idle position and released more rapidly than if resilient means such as a spring are exclusively relied upon for that purpose.

Typical operation of the described illustrative electrical system is as follows. Selector switch handle 500 will be assumed for definiteness in its left hand position, with switch S operated for automatic drive of left hand blade control mechanism 70. If the actual grade angle of the blade corresponds to the desired angle set at dial 585, bridge circuit 580 is balanced, and zero input signal is supplied via transformer T2 to amplifier 600. With zero output signal at 604, the grids of both gas tubes V3 and V4 are held at ground potential by vibrator 550, cutting off the tubes. All relays A, B, C, D, E and F, and power relays J, K and L are then idle.

If the operator now manually operates the right hand draw-bar lift mechanism to drive the right hand end of blade 60 upward, for example, that blade movement is transmitted via mechanical linkage 130 and computer 110 to potentiometer 230, shifting the potentiometer brush and unbalancing the bridge. The resulting error signal is amplified and appears as a square wave at 604 in such phase that vibrator 550 grounds the negative-going wave transmitted by C5 and the positive-going wave transmitted by C6. The ungrounded wave in each instance is averaged by filter 606. The grid potential of V3 rises rapidly above cut-off, causing the tube to fire on the first following half-cycle of plate energization. The resulting plate current, aided by action of C11 and R24, operates relay A. That isolates tube V4 at open switch Axy, so that it cannot be fired by spurious transient voltages; and operates relay C.

Closure of relay switch C'st operates power relay J via switch S'st, energizing solenoid winding 400 and moving armature 382 upward. Closure of switch C'wx operates timing relay E. Closure of switch C'yz closes a holding circuit for relay C via switch Suv limit switch Gyz. Closure of switch C'uv desensitizes gas tube V3, causing it to cease firing on alternate half-cycles unless the error signal at 604 has increased fast enough to maintain the grid of V3 above cut-off in spite of the desensitizing action.

If, for example, the operator makes only a slight adjustment via the right hand blade lift, returning it promptly to neutral position, the resulting blade movement may cause only a minimum error signal at 604, typically corresponding to movement of the brush of potentiometer R1 between two adjacent turns of the winding in the case of a wire-wound potentiometer. With such a minimum signal, the system is typically actuated as just described; but tube V3 ceases to fire as soon as the desensitizing circuit is closed. Relay A is then idled, but relay C is held operated via its holding circuit until that circuit is opened at limit switch Gyz upon operation of that switch by solenoid armature 382. The subsequent action under that condition will be described below.

If, for example, the operator drives the right hand end of the blade up continuously at a definite speed, the error signal at 604 typically increases at such a rate that, by the time relay C closes the desensitizing circuit, the existing error signal exceeds the increased critical value and hence is sufficient to maintain the grid of V3 above cut-off in spite of that circuit. Under that condition, tube V3 continues to fire every half-cycle, holding relay A in.

Armature 382 is then driven to the upper end of its travel, engaging the left blade drive. Operation of limit switch G, which may occur, for example, approximately 50 milliseconds after solenoid energization, opens the holding circuit for relay C at switch Gyx, returning relay C to exclusive control by relay A. Operation of limit switch G also operates timing relay F, preparing the actuating circuit for centering solenoid winding 404.

The system continues in the described driving condition as long as the error signal exceeds the increased critical value. In that condition, relays A, C, E and F and power relay J are operated and the left hand blade drive is engaged and is driving the blade upward positively at full speed. Since the manually controlled right blade drive and the automatically controlled left blade drive typically operate at approximately equal speeds, the blade tends to be lifted continuously (as long as the manual drive is engaged) at a grade angle that remains a close approximation to the desired grade angle. The departure from that angle during such drive is typically slightly greater than is required to produce an error signal at 604 that exceeds the described increased critical value.

If the operator now returns the right hand blade drive to neutral, the left blade drive continues to operate for a fraction of a second, rapidly restoring the grade angle toward the desired value and reducing the error signal at 604. Aided by the desensitizing circuit, the grid of V3 rapidly drops below cut-off, idling relay A. Relay C then releases, preferably after a short time delay, regulated by R30, releasing power relay J and deenergizing solenoid coil 400. Release of relay C also energizes centering coil 404 by closure of switch Crs, driving armature 382 rapidly toward neutral position. The left blade drive is thereby disengaged by return of clutch member 344 to neutral position. As armature 382 returns to neutral position, limit switch G is released, opening the circuit via switch G'wx to relay coil Fq. That relay releases, deenergizing centering coil 404, but only after a time sufficient to establish armature 382 in neutral position. The system is now restored to normal sensitivity by opening of relay switch C'uv. Hence, if the blade has stopped short of the desired grade angle, or if it has overshot that angle by a significant amount, the error signal at 604 is sufficient to raise the grid of either V3 or V4 above cut-off, depending upon the phase of the error signal. However, both tubes remain disabled until release of relay E, which holds their cathode circuits open at Eyz. As already explained, relay E is timed to release only after a sufficient settling time to permit all transient voltages in the system to decay. That settling time varies greatly with the detailed design of the system. In a system designed for compactness and economy it may be as long as 0.4 second, for example. That action of relay E and the described interlock which permits only one channel to operate at a time permit great economy in construction of the system, eliminating complex voltage stabilizing devices that would otherwise be required.

In the present example, following release of relay E, tube V3 will typically fire again, operating relays A, C, E, F and J and energizing solenoid coil 400 in the manner just described. However, since the error signal is now relatively small, desensitization of the system upon operation of relay C may immediately cause V3 to cease firing. Relay A is thereby released, and relay C is held only via limit switch G$yz$.

Under that condition, control of the time during which the blade drive is held engaged is independent of the actual value of the error signal, and is controlled entirely by the characteristics of the system itself. As already explained, the holding circuit for relay C via limit switch G$yz$ insures that solenoid coil 400 will actually cause engagement of the blade drive before being deenergized. And the further delay in release of relay C, typically adjustable at R30, permits accurate determination of the total resulting engagement time of the blade drive. It is particularly desirable to separate those two timing functions in a system in which the drive mechanism may behave irregularly in any respect. In the present system, for example, the drive clutch members 336, 340 and 344 (Fig. 4) may be in position to engage immediately; or the flat tops of their opposing teeth may initially abut each other, delaying engagement until their teeth become properly aligned. In the latter case, abutting relation of the teeth typically checks the solenoid armature movement short of the limit switch, so that relay C remains energized. Energization of the solenoid is thus maintained until the clutch teeth actually mesh, positively initiating blade drive. Although limit switch G$yz$ then opens, the set time delay for release of relay C produces a definite minimum period of actual drive engagement that is substantially uniform and independent of the detailed meshing action of the clutch.

With the described system, the blade is driven rapidly toward the desired position until the deviation is less than a relatively coarse critical value; and is then driven in a succession of intermittent approach movements of predetermined magnitude until the deviation is less than a relatively fine critical value.

Figure 6:
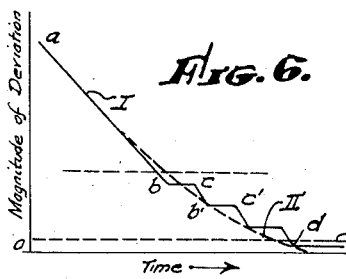
Fig. 6 is a graph illustrating typical operation of the servo mechanism.

Fig. 6 is a schematic graph in which the solid line I represents the magnitude of the grade angle deviation, that is, the departure of the existing blade grade angle from the desired value, plotted as a function of time during a typical control operation. The dashed line III represents the effective sensitivity of the system, that is, the relatively fine critical value of the deviation that will just produce corrective action by causing tube V3 or V4 to fire. That critical value is adjustable, for example, at potentiometer R11. It typically corresponds, in the present embodiment, to a deviation of the blade from the desired grade angle equal to about 0.1 percent of slope, which amounts to about ⅛ inch at one end of a 10-foot blade. The dashed line IV in Fig. 6 represents the relatively coarse critical value of the deviation at which corrective action of the system is continuous rather than intermittent, that is, at which tube V3 or V4 continues to fire even though desensitized. That coarse critical value is adjustable by varying the degree of desensitization, as at variable resistances R26 and R27 in channels I and II, respectively.

Assuming an initial error signal corresponding to the point $a$ in Fig. 6, and hence larger than the coarse critical value IV, the blade is driven continuously in a direction to reduce the deviation, as represented by line segment $ab$. During that action tube V3, say, fires continuously on every half-cycle of energizing plate voltage in spite of desensitization by closure of C'$uv$. As soon as the deviation becomes less than the coarse critical value IV, the tube ceases to fire, bringing the blade to a stop shortly afterward at $b$, as already described. The vertical distance from line IV to point $b$ is determined largely by the release delay time of relays C and D, adjustable at R30 and R31 in the respective channels.

If point $b$ corresponds to a grade angle deviation greater than the fine critical value III, the blade remains stationary only for a short period, represented in Fig. 6 by the line segment $bc$. That time period is determined primarily by the release delay time of relay E, which disables both channels at open E$yz$, and is adjustable as at R32. Upon idling of relay E, control is returned to tubes V3 and V4, now operating at full sensitivity. Hence a second tool drive cycle takes place, as represented by the line segment $cb'$, provided the grade angle deviation exceeds the fine critical value III. However, initiation of the drive immediately desensitizes the system, bringing the tool movement to a halt at $b'$ after a travel which is determined primarily by the release delay time of relays C and D, adjustable at R30 and R31 as already explained. Such intermittent tool drive actions are repeated until the tool comes to rest, as indicated at $d$ in Fig. 6, at a position where the grade angle deviation is less than the fine critical value III. The system then remains idle until that value is again exceeded.

The effective duration of each discrete approach movement is preferably adjusted to drive the blade through an angle approximately equal to twice the fine critical value of the deviation, that is, twice the desired angular accuracy of the system. That produces a satisfactorily rapid approach to the desired value, while insuring that the blade will only occasionally be driven beyond the desired position by a sufficient angle to require a cycle of reverse drive.

The described series of intermittent approach movements has the effect of moving the blade at an average rate that is appreciably less than the continuous drive speed. Hence, when a large correction is to be made, the blade drives at full speed until the error is less than the definite coarse critical value, and then approaches the final equilibrium position at a slower rate. The present type of control thus simulates the so-called proportional or rate-of-approach control of some servo systems, whereby the rate of drive is caused to decrease in proportion to the decreasing error, as schematically shown by curve II in Fig. 6. The present system, however, accomplishes a corresponding function with a drive mechanism that operates at a set speed and is always either fully engaged or fully disengaged.

In systems in which drive engagement is subject to little or no time variation, or if uniformity of actual drive time on all drive impulses is not required, it may be preferred to omit the described circuitry for insuring energization of the solenoid driving winding until the drive mechanism is actually engaged. In the present embodiment, that circuitry includes the normally closed limit switches G$yz$ and H$yz$, relay holding switches C$yz$ and D$yz$, and the four reversing switches S$uv$, S$yz$, T$uv$ and T$yz$. With that simplification, the period of drive when the error signal is small is still variable by adjustment of the release time of relays C and D, as by variation of R30 and R31. The metered portion of the drive time is then in effect measured from the release of relay A or B (which opens the winding of C or D), rather than from the time of actual drive engagement, as in the preferred embodiment.

If it is desired to omit also the normally open limit switches G$wx$ and H$wx$, through which relay F is energized in the present embodiment, relay F may be controlled directly by relays C and D. For example, line 645 from relay winding F$q$ may be connected directly to line 626, through which relay E is energized from relays C and D. With the particular time delay mechanism shown for relay E, capacitance C19 must then be prevented from discharging through relay winding F$q$ in parallel with E$q$, as may be done, for example, by inserting a suitably oriented rectifying element in line 626 between the point at which line 645 is connected to it and the junction 652 between E$q$ and E$x$. With that alternative energizing circuit, relay F is actuated upon closure of relay C or D, preparing the described energizing circuit for centering coil relay L. Release of C or D energizes that circuit and also opens the winding of timing relay F. After its set delay time, relay F releases, ending the set period of energization of solenoid centering winding 404.

Figure 7:
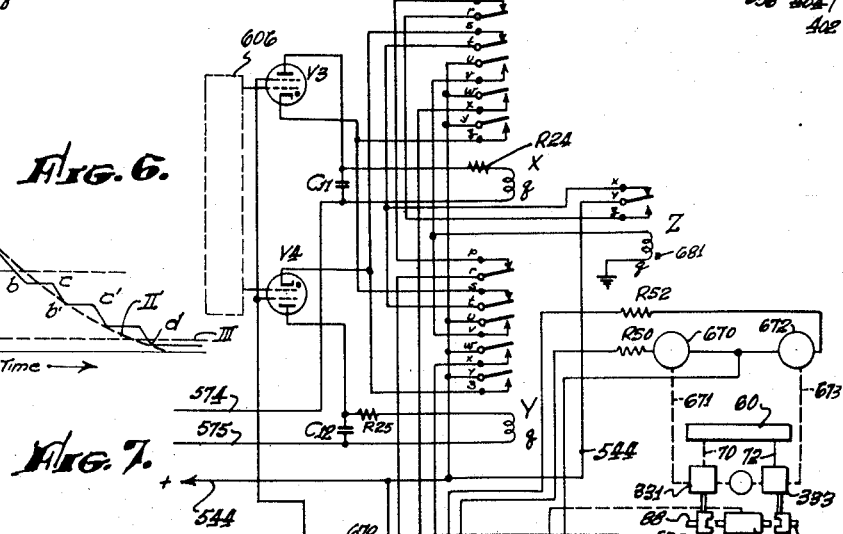
Fig. 7 is a schematic diagram corresponding to a portion of Fig. 2 and representing a modification.

A modified embodiment of the timing and control system is represented in Figs. 7 and 8. The remainder of the modified system may be as already described and illustrated. Many elements of the modified system correspond closely to the previous system, are generally identified by the same numerals and require no further description.

In the system of Figs. 7 and 8, part of the control action is derived from actual movement of the tool drive mechanism itself. The clutch mechanism, or its equivalent, of the actual tool drive, which may be the regular manual drive of an existing machine and may be positive in its operation, thus becomes a part of the servo control system.

For that purpose a control signal may be derived from movement of the actual tool drive in any suitable manner. For example, many types of electrical and magnetic transducers are known for producing an electrical signal such as a voltage signal in response to shaft rotation or other mechanical movement. Two such transducers are indicated schematically at 670 and 672 in Figs. 7 and 8, responsive to engagement of clutch mechanisms 331 and 333, respectively, of the left and right drawbar lift drives 70 and 72 of the present illustrative machine. Those transducers may typically comprise electromagnetic alternators of known type coupled directly to output shafts 330 (Fig. 4) of those clutch mechanisms as indicated by the dashed lines 671 and 673. Those alternators produce an alternating current voltage in response to shaft rotation in either direction. Means are provided for normally disabling those signals and for rendering effective only the signal derived from the drive mechanism that is under automatic control. As illustratively shown, the alternators 670 and 672 are connected in series with each other and with the resistances R50 and R52, respectively, and each alternator and its resistance are shunted via a normally closed switch. Those switches are the normally closed switches Syz and Tyz, under control of selector lever 500. When that lever is moved from neutral position to put one or other of the blade drive mechanisms under automatic control, the alternator of that drive is rendered effective by opening of its shunting circuit, the other alternator remaining disabled by its shunt circuit.

The alternator output is supplied to a full-wave rectifier, indicated schematically at 676, the positive output terminal of which is connected via line 678 to the positive supply line 544 of the system. The negative output terminal of rectifier 676 is connected via the line 679 to the shield grids of both gas tubes V3 and V4. Rectifier 676 is preferably shunted by a capacitor C30 and a variable resistance R54, connected in parallel, which smooth the direct current produced. With both alternators shorted out, tubes V3 and V4 act normally, with the tube shield grids effectively tied to the respective cathodes. The system then responds to an error signal with full sensitivity in the manner already explained. With either alternator effective and driven, a negative bias is supplied to the shield grids of both tubes, increasing the threshold signal required at their control grids to fire the tubes, and effectively desensitizing the system. That action is effective only on the tube in the active channel, since the other tube is locked out by opening of its cathode circuit. The degree of desensitization is variable, for example, by variation of R54.

With that general type of desensitizing action, the mechanical clutches 331 and 333 of the blade positioning mechanism may be considered as a part of the densensitizing control loop, and desensitization can occur only after actual clutch engagement. Any delay in clutch engagement, as by failure of the clutch teeth to mesh immediately, causes a corresponding delay in desensitization. Hence, once a tube fires, initiating control action, it typically continues to fire until that control action actually occurs. The duration of actual drive engagement is thereby rendered independent of any delay in clutch engagement, a function which was provided in the previously described system by means of secondary relays C and D and their holding circuits via the limit switches G and H. In the present system those limit switches may be omitted, and the remaining functions of the primary relays and secondary relays of the previous system may be combined, for each channel, in a single relay. The latter relays are designated X and Y in Figs. 7 and 8. They are operated under control of gas tubes V3 and V4, respectively, as were primary relays A and B of the previous system. Solenoid control relays J and K are controlled by relays X and Y via selection switches S and T in substantially the manner already described for their control by relays C and D of the previous system.

The functions performed by relays E and F of the previous system are combined in the present system in a single relay designated Z. Those functions are timing the period during which the system is disabled, as by isolation of the gas tube cathodes, during decay of transients; and timing energization of centering solenoid winding 404 via relay L. Relay Z is operated in a manner corresponding to operation of relay E in the previous system, namely, upon closure of either switch X'uv or Y'uv. Release of relay Z is delayed by any suitable means, indicated at 681 as a copper slug coil, for a time corresponding generally to the described delay time of relay E. Relay switch Zxy corresponds fully to switch Eyz of the previous system, and opens the cathode actuating circuit of the gas tubes whenever relay Z is actuated, a holding cathode circuit being provided via X'yz and Y'yz for the respective tubes so long as the latter fire continuously. Relay switch Z'yz is connected, like switch F'yz of the previous system, in the energizing circuit for centering coil relay L. That circuit includes in series the normally open relay switches Xrp and Yrp. Hence the centering coil is energized only during the release delay time of relay Z, during which period relay Z is still actuated but relays X and Y are both idle. By thus timing the centering coil by the same relay Z which times disabling of the system after each action, one or other of those time periods may be longer than is otherwise necessary, but that is often little disadvantage and may be acceptable in view of the economy involved.

I claim:

1. In a control system for a movable member, which system comprises power means actuable to drive the member, sensing means responsive to deviation of the member from a predetermined position and acting to develop a control signal corresponding to the magnitude of that deviation; coupling means for controlling the power means in response to the control signal and comprising drive initiating means for actuating the power means in response to a control signal greater than a first critical value, drive metering means for deactuating the power means in response to a control signal less than a second critical value, the second critical value being greater than the first, and means acting to disable said drive metering means during a predetermined time period following drive actuation.

2. In a control system for a movable member, power means actuable to drive the member, power actuating means energizable to actuate the power means, sensing means responsive to deviation of the member from a predetermined position, control means for selectively energizing the power actuating means in response to values of said deviation that exceed a critical magnitude, and timing means responsive to energization of the power actuating means and acting to prevent deenergization thereof during a predetermined time interval, irrespective of the control means.

3. In a control system for a movable member, means responsive to deviation of the member from a predetermined position and for producing an electrical signal having a magnitude which corresponds to the magnitude of said deviation, power means actuable to drive the member, a gas tube having a control electrode, means including a series impedance for supplying the electrical signal as control signal to the control electrode, electrical coupling means energizable under control of the gas tube and acting when energized to cause actuation of the power means, circuit means connected between the control electrode and a source of relatively negative potential and including in series an impedance and switch means, and means for closing said switch means in response to energization of said coupling means.

4. In a control system for a movable member, means responsive to deviation of the member from a predetermined position and for producing an electrical signal corresponding to said deviation, power means actuable to drive the member, control circuit means for actuating the power means under control of the error signal to reduce the magnitude of the deviation, timing means actuable to disable the control circuit means during a predetermined time interval following said actuation, and means for actuating the timing means in timed relation to de-actuation of the power means.

5. In a control system for a member movable in two opposite directions, drive means actuable selectively to drive the member in said directions, two energizable control circuit means acting when energized to actuate the drive means in the respective directions, sensing means for producing a signal in response to deviation of the member from a predetermined position, coupling circuit means normally acting to energize one of the control circuit means in response to a signal, and means for disabling both the coupling circuit means for a predetermined time period following deactuation of the drive means.

6. In a control system for a movable member, power means actuable to drive the member, solenoid means comprising an armature having a normal position in which the power means is de-actuated and having an operating position in which the power means is actuated, a first solenoid winding energizable to displace the armature to its operating position, a second solenoid winding energizable to return the armature to its normal position, servo control means responsive to deviation of the member from a predetermined position and comprising circuit means for energizing the first solenoid winding in response to said deviation, second circuit means for energizing the second solenoid winding substantially simultaneously with de-energization of the first solenoid winding, and timing means acting to maintain energization of the second solenoid winding for a predetermined limited time interval.

7. In a control system for a movable member, power means actuable to drive the member, solenoid means comprising an armature having a normal position in which the powers mean is de-actuated an an operating position in which the power means is actuated, a first solenoid winding energizable to displace the armature to its operating position, a second solenoid winding energizable to return the armature to its normal position, circuit means for energizing the second solenoid winding and including series connected normally closed first switch means and normally open second switch means, sensing means energizable in response to deviation of the member from a predetermined position, coupling means acting in response to energization of the sensing means to energize the first solenoid winding and to open the first switch means, means acting to close the second switch means in response to movement of the armature to operating position, and time delay means acting to delay opening of the second switch means for a predetermined time period following movement of the armature away from operating position.

References Cited in the file of this patent
UNITED STATES PATENTS

| | | |
|---|---|---|
| 2,425,733 | Gille et al. | Aug. 19, 1947 |
| 2,452,311 | Markusen | Oct. 26, 1948 |
| 2,455,364 | Hays | Dec. 7, 1948 |
| 2,534,801 | Siltamaki | Dec. 19, 1950 |